JOHN F. WHELAHAN
INVENTOR.

Fig 7

United States Patent Office 3,496,803
Patented Feb. 24, 1970

3,496,803
CONTROL APPARATUS FOR DOUBLE DIFFERENTIAL TRANSMISSIONS COUPLED TO A FREE POWER TURBINE
John F. Whelahan, Monroe, Conn., assignor to Arco Corporation, Cincinnati, Ohio, a corporation of Delaware
Filed July 16, 1968, Ser. No. 745,189
Int. Cl. B60k *17/10*
U.S. Cl. 74—843                                8 Claims

ABSTRACT OF THE DISCLOSURE

A control system for a power shifting, multiple gear ratio transmission coupled to a free power turbine wherein hydraulic comparator means initiates shifts by comparing power turbine acceleration with power turbine speed. Further, hydraulic means coupled to the hydraulic comparator means actuates the necessary mechanical components of the double differential transmission. The ultimate need for a shift in order to prevent overspeed or underspeed of the turbine is anticipated and performed by the combined hydraulic means before critical conditions can arise. Control is performed without the necessity of having to directly measure acceleration or power turbine speed by comparing the turbine's constant speed output characteristics with the actual transmission input. In this manner, the turbine is used as an accelerometer and speed indicator.

---

The present invention relates to a control apparatus for transmissions coupled to a free power turbine and more particularly such control apparatus for double differential transmissions wherein shifts are initiated by comparing the turbine's constant speed output characteristics with the actual transmission input.

A double differential transmission of the type here concerned is similar to that shown and described in patent application Ser. No. 587,569 now Pat. No. 3,398,605 filed by R. Ainsworth and W. J. Stein on Oct. 18, 1966, which is hereby incorporated by reference, and assigned to the same assignee as this patent application. Such a transmission is similar in its overall arrangement to that described in U.S. Patent No. 3,199,376 issued to G. M. DeLalio on Aug. 10, 1965, entitled "Steering Transmission for Track Laying Vehicles." However, while the DeLalio transmission is arranged for operation with a constant speed power source, the double differential transmission here concerned differs in that it is arranged for optimum performance with a variable speed power source, i.e., a turbine.

As is known in the art, a free power gas turbine engine is capable of operation at high efficiency over a wide range of speeds. This transmission system takes advantage of such a variable speed characteristic. In the DeLalio transmission, a hydraulic power system is used for transferring power from one planetary gear set to a second set to change the driving ratio. Because DeLalio's input speed is maintained constant, power is transmitted through the hydraulics system throughout essentially the entire range of operation. In the present case, however, power is transmitted through the hydraulics only during the power transfer operations. It is well known in the art that hydraulic power circuits are much less efficient than mechanical gear trains, i.e., overall system efficiency is increased and the size and power requirements of the hydraulic units are reduced by not transmitting power through them, except for the short periods of time when the power is being transferred to another planetary gear set.

It is an object of the present invention to provide a control system for a double differential transmission.

Another object of the invention is to provide in combination with a double differential transmission adapted to be coupled to a free power source, a control system for such a transmission.

A further object of the invention is to provide a control system for double differential transmissions wherein shifts are initiated by comparing acceleration of a power turbine with the speed of the power turbine.

A still further object of the invention is to provide means for and a method of controlling an all mechanical power shifting double differential transmission adapted to be coupled to a turbine wherein the output torque chracteristic of the turbine is used to measure the acceleration or deceleration of a vehicle and thereby determine the correct engine speed for existing conditions to perform shifting operations.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Broadly, the transmission comprises two input power planetary gear sets for driving tracks of a track laying vehicle. Input power, supplied from a variable speed power source, such as a free power gas turbine, is connected to the tracks through the two planetary input gear sets by means of four gears, each of which provides a different drive ratio and is selectable by means of four clutches. Except during gear shifting operations, more fully described hereinafter, power is mechanically transmitted through one input planetary gear set and one selected gear. During gear shifting operations, power is transferred from the one planetary gear set to the other by means of a hydraulic system consisting of two units operating alternately as a pump and a motor. The hydraulic system serves to selectively lock the reaction member of the one planetary gear set for 100% mechanical transmission and serves to variably control the reaction forces on the reaction member during the power transfer period. The system also includes two output planetary gear sets which are driven by the four selectable gears. For steering the vehicle, an additional hydraulic system, consisting of a pump and motor, is used for oppositely rotating the reaction members of the two output planetaries to change their relative speeds.

Figure 1:
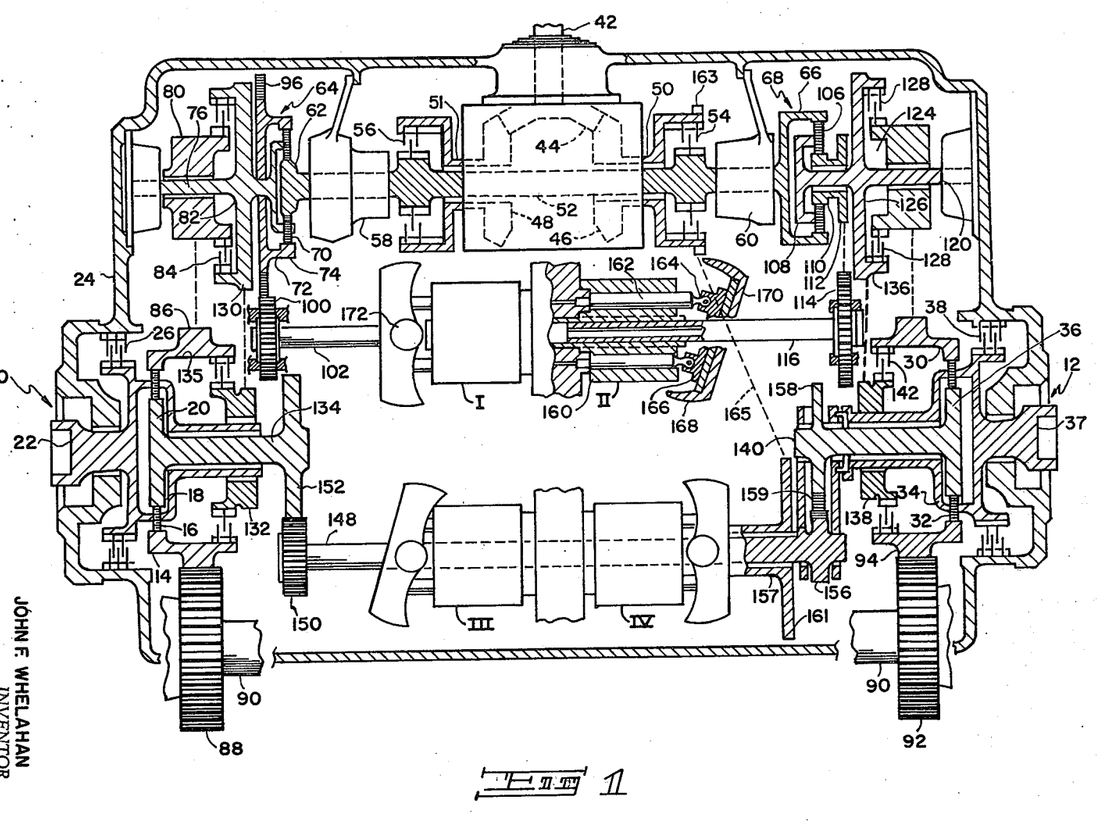
FIGURE 1 is a somewhat schematic sectional illustration of a preferred form of this invention.
Figure 2:
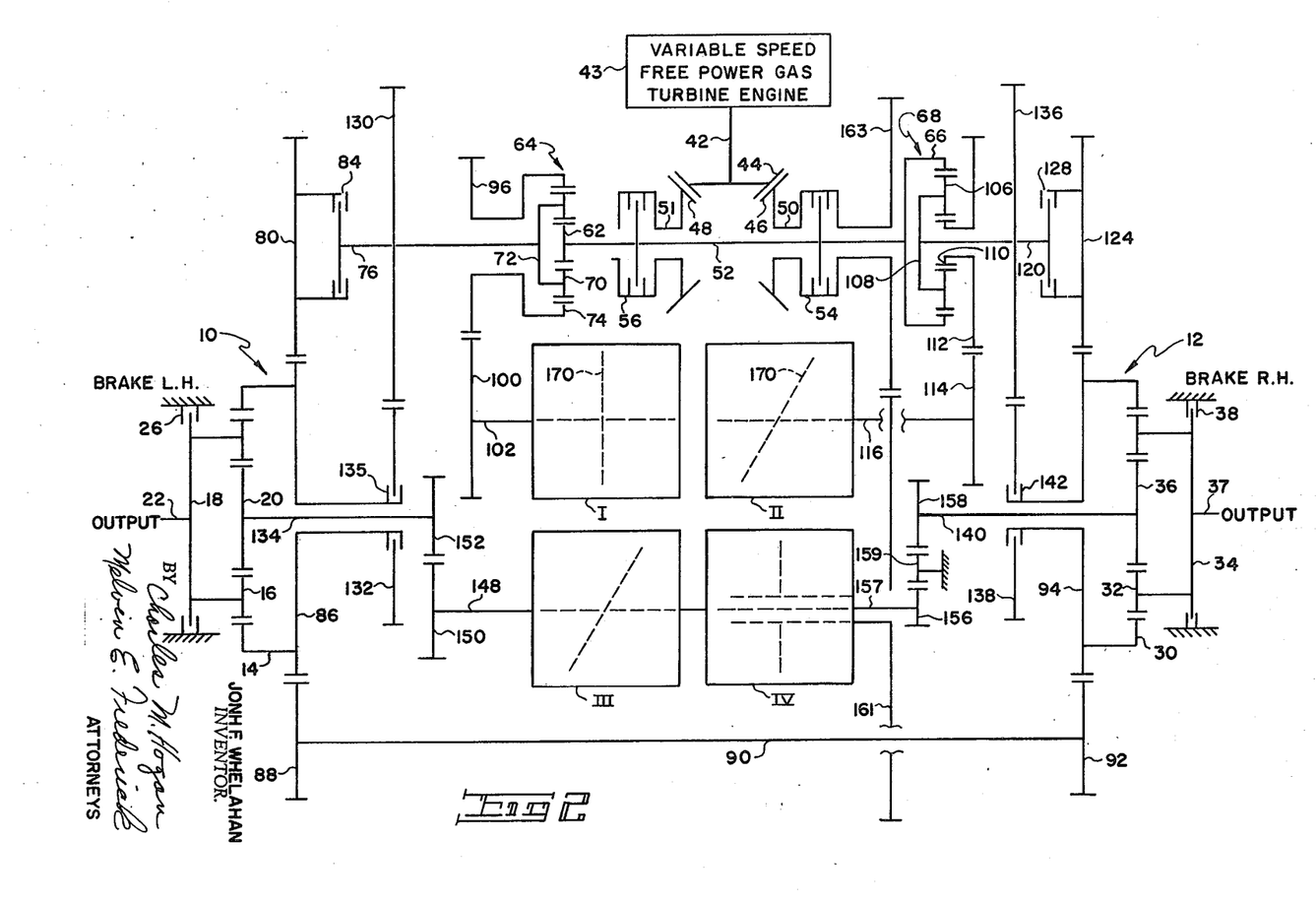
FIGURE 2 is a schematic representation of the apparatus of FIGURE 1.

In referring to the drawings, it should be borne in mind that FIGURE 1 is somewhat schematic in that the clutches, bearings, brakes, etc. have not been shown in detail and, further, in the fact that the cross section has been laid open to more vividly expose the various components, and, consequently, certain components are out of plane. While like reference characters designate corresponding parts in FIGURES 1 and 2, is should be borne in mind that FIGURE 2 is entirely schematic and many of the parts shown in FIGURE 1 are not included in FIGURE 2.

The transmission includes two output planetary gear sets, generally indicated at 10 and 12, respectively. The planetary gear set 10 includes a ring gear 14, planetary gears 16 rotatably supported on a carrier 18, and a sun gear 20. The carrier 18 drives an output shaft 22 which is rotatably supported within the housing 24. A conventional brake 26, having one portion fixed to the housing 24 and a second portion fixed to the shaft 22, provides braking for its associated vehicle track.

The second planetary set 12 is identically arranged, having a ring gear 30, planetary gears 32 rotatably supported in a carrier 34, and a sun gear 36. The carrier 34 drives an output shaft 37 which is rotatably supported in the housing 24. A brake 38, having one portion fixed to the housing and a second portion fixed to shaft 37, provides braking for its associated vehicle track.

In the arrangement of the planetary gear sets 10 and 12, as shown, the ring gears constitute the input or driving members for their respective sets, and the planetary gear carriers constitute the output or driven members, while the sun gear constitutes the reaction member. It will be understood that for a particular embodiment the various elements could be arranged so that any one could serve the function provided by any other.

Power for the transmission is supplied from a variable speed power source such as a free power gas turbine engine 43 (FIGURE 2) to an input shaft 42. An input bevel gear 44 fixed to the shaft 42 meshes with forward and reverse bevel gears 46 and 48 which are fixed to hollow rotatable shafts 50 and 51, respectively. The shafts 50 and 51 are rotatably supported from housing 24 and are selectively coupled to the drive shaft 52 by means of a forward clutch 54 or a reverse clutch 56. The drive shaft 52 is suitably supported in bearings 58 and 60 supported from the housing 24 and carries at its left end (as shown in the drawings) the input member, sun gear 62, of a planetary gear set 64, while on its right end it carries the input member, ring gear 66, of a planetary gear set 68. With the clutch 54 engaged and the clutch 56 disengaged, the drive shaft 52 rotates in a forward driving direction. With the clutch 56 engaged and the clutch 54 disengaged, the drive shaft 52 rotates in the reverse driving direction. It will be understood that for a particular embodiment in the roles of the forward and reverse gears and clutches are interchangeable.

The planetary gear set 64 also includes planetary gears 70, rotatably supported on a carrier 72, and a reaction member, ring gear 74. The carrier shaft 76 is rotatably supported from housing 24. The carrier shaft 76 rotatably supports a first speed range gear 80 and fixedly carries a hub 82. For operation in a first speed range, a first speed range clutch 84, having portions fixed to the gear 80 and the hub 82, provides a driving connection between the carrier 72 and the gear 80. The gear 80 in turn meshes with the gear 86 on the outer periphery of ring gear 14 and, when rotated, serves to drive the output shaft 22 through the planetary gear set 10.

For driving the output shaft 37, the gear 86 also meshes with a gear 88 fixedly supported on the left end of a rotatably mounted cross-over shaft 90. The cross-over shaft 90 also carries at its right end a fixedly mounted gear 92 which drives the ring gear 30 of the planetary gear set 12 through a gear 94 on the outer periphery of the ring gear, thereby resulting in rotation of the output shaft 37.

A gear 96 fixed to the ring gear 74 of planetary gear set 64 meshes with a gear 100 fixed to the rotatably supported input shaft 102 of a hydrostatic unit I, hereinafter to be described.

The planetary gear set 68 also includes planetary gears 106, rotatably supported on a carrier 108, and a reaction member, sun gear 110. A gear 112 fixed to the sun gear 110 meshes with a gear 114 fixed to a rotatably supported shaft 116 of a hydrostatic unit II, which is identical to the unit I.

The carrier shaft 120, rotatably supported from housing 24, rotatably supports a second speed range gear 124 and fixedly carries a hub 126. For driving in a second speed range, a second speed range clutch 128, having portions fixed to the second speed range gear 124 and the hub 126, provides a driving connection between the carrier 108 and the gear 124. The second speed range gear 124, in turn, meshes with the gear 94 on the outer periphery of ring gear 30 of the output planetary gear set 12 and, when rotated, serves to drive the output shaft 37 through the planetary gear set 12. For driving the output shaft 22, the gear 94, in turn meshes with the gear 92 carried by the cross-over shaft 90 which serves to rotate the gear 88. Rotation of gear 88 causes the rotation of the ring gear 14 of the output planetary gear set 10 to rotate the output shaft 22.

The hub 82 carried by the carrier shaft 76 of the planetary gear set 64 carries a gear 130 which meshes with a third speed range gear 132 rotatably supported on the shaft of carrier 18 of planetary gear set 10. For operation in a third speed range, the ring gear 14 of the planetary gear set 10 is driven by the gears 130 and 132 through a third speed range clutch 135 having portions fixed to gears 132 and 14. Power is also transferred to the output shaft 37 through the cross-over shaft 90.

For operation in a fourth speed range, the hub 126 in the planetary gear set 68 similarly carries a gear 136 which meshes with a fourth speed range gear 138 rotatably supported on the shaft of carrier 34 of planetary gear set 12. Rotation of the gear 136 and 138 serves to drive the output shaft 37 through a fourth speed range clutch 142 having portions fixed to gears 138 and 30. As before, power is transferred to the output shaft 22 through the cross-over shaft 90.

For steering, two additional hydrostatic units III and IV, both functionally identical to the units I and II, are provided. The shaft 148 of hydrostatic unit III extends through both units and carries a gear at each end. The gear 150 on one end meshes with gear 152 fixed on the shaft 134 of the sun gear 20. The other end of shaft 148 carries a gear 156 which drives a gear 158 fixed to the shaft 140 of the sun gear 36 through an idler gear 159. Because of the idler gear 159, rotation of shaft 148 causes rotation of the associated sun gears 20 and 36 in opposite directions so as to vary the effective gear ratios of the planetary gear sets 10 and 12 and hence vary the relative speeds of the output shafts 22 and 37, respectively, to effect steering of the vehicle. In addition, the idler gear 159 allows the torque reaction of planetary set 10 to be balanced against the torque reaction of planetary set 12 for normal straight forward or reverse operation. The hollow shaft 157 of hydrostatic unit IV, suitably supported from housing 24, carries a gear 161 and it is continuously driven by the engine 43 through a gear 163 fixed to the shaft 50 and other gearing (indicated only by a dotted line 165).

A complete description of a typical hydrostatic unit is included in U.S. Patent No. 3,212,358 issued to G. M. DeLalio on Oct. 19, 1965, and that description is incorporated by reference herein. While such a hydrostatic unit is suitable for the present application, it is to be understood that various other types of equipment may be substituted and may, in fact, be preferred. In the present construction the four hydrostatic units are identical, except for the arrangement of the shafts on units III and IV.

Briefly described, each hydrostatic unit comprises a drum 160 having a plurality of cylinders which slidably receive pistons 162 in a conventional manner. The end portion of each piston is provided with a ball joint 164 to which a slipper member 166 is pivoted. As its respective shaft rotates, the drum 160, pistons 162, and slipper members 166 rotate. Slipper member 166 bears against a thrust plate 168 supported within and fixed to a swash plate 170. The swash plate 170 is pivoted on trunnions 172, As the drum and pistons turn, the slipper members 166 slide on the thrust plate 168, which causes the pistons 162 to move in and out of the respective drums 160 to displace fluid. As the swash plate angle is reduced, the piston stroke is also reduced, which also reduces the displacement per revolution of its shaft.

With the swash plate of one of the units at zero angle, be locked. By simultaneously tilting the swash plates of the associated unit is at a maximum angle, its shaft will be locekd. By simultaneously tilting the swash plates of associated units, the power transferred through the units, one acting as a pump and the other as a motor, can be varied from zero to a maximum. For a further and more complete discussion of the construction and operation of the transmission, reference is made to the aforementioned Ainsworth et al. patent application Ser. No. 587,569.

In order to take advantage of the free power turbines inverse torque-speed relationship, an appropriate control system in accordance with the present invention for the described transmission must permit maximum use of the all-mechanical speed ranges and, at the same time, prevent over- and under-speeding of the turbine during the shifting sequence.

As previously described, the variable displacement hydraulic units I and II serve as reaction members to the differentials. The pressure developed in each of these units is the same because they are interconnected and, accordingly, the ratio of torque transmitted to each differential is proportional to the displacement of its associated hydraulic unit. When one unit is at full displacement, the other unit is at zero displacement. In this condition, the differential coupled to the zero displacement unit transmits zero torque and the differential coupled to the full displacement unit develops a reaction torque as required to support the imposed load. There is no flow between the units I and II because the zero displacement unit cannot receive flow from the full displacement unit. All torque is, therefore, transmitted mechanically through the differential coupled to the full displacement unit.

Broadly, a shift is made by engaging the first and second range clutches, the second and third range clutches, or the third and fourth range clutches and then changing the displacement ratio of the aforementioned two hydraulic units so that the full displacement unit goes to zero displacement and the zero displacement unit simultaneously goes to full displacement. When the changing of the ratio displacement has been completed, the clutch associated with the zero displacement unit is disengaged and the transmission is once again transmitting all torque mechanically through the differential coupled to the full displacement unit and its associated clutch and gear set. Upon a shift command, the control system must and does, therefore, select the proper clutch for engagement and then move the swash plates of hydraulic units I and II at a controlled rate until the ratio of their displacements is inversed and, at the completion of this swash plate movement, disengages the proper clutch. The ratio changes are made without the interruption of output power, and the vehicle operator is capable of controlling the vehicle speed and the degree of acceleration or deceleration by throttle adjustment alone. Further, the ratio changes are smooth enough to insure personnel comfort and drive line longevity.

Figure 3:
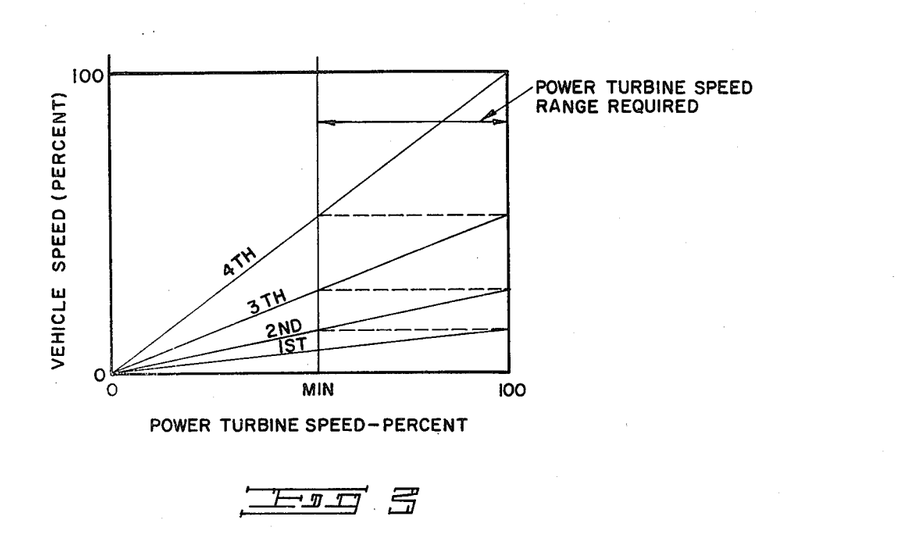
FIGURE 3 is a graphic representation of vehicle speed versus power turbine speed for four speed ranges.

In order that engine torque be transferred through the transmission in parts that are completely mechanical, a certain power turbine speed range is required. This speed range depends on the number of gear ranges in the transmission and the maximum ground speed of the vehicle. A graphic representation of vehicle speed versus power turbine speed for four speed ranges is shown in FIGURE 3.

The maximum permittable turbine speed dictates the upper limit of the speed range while the minimum permittable turbine speed dictates the number of gear ranges required. The minimum turbine speed selected is preferably an engine speed at which the off-optimum engine losses are less and preferably substantially less than the losses associated with the rotating elements of a hydromechanical transmission which must modulate the ratio to keep the engine at optimum speed.

By using the power turbine speed range, the entire vehicle ground speed range can be covered by mechanical transmission ranges except when shifting from one mechanical range to another. During shifts, power is transferred through two paths, mechanical and hydrostatic. In order to retain the high efficiency of an all mechanical operation, the time spent in changing ratios is kept to a minimum and any steady-state operation is in a fixed mechanical gear range. Prolonged rate of ratio change modulation during a shift would be a reversion to inefficient hydromechanical operation. Accordingly, once a shift is initiated, it is, in accordance with the inventon, carried to completion. This necessarily limits the time which can be allotted for a shift because if the shift lasts too long, the operational conditions can cause overspeed or underspeed of the engine if the shift is carried to completion unidirectionally.

If a fixed rate of ratio change initiated by power turbine speed biased by level of accelerations is provided in accordance with the invention, shifts are completed in a limited time interval. Upshifts are initiated early (at lower power turbine speeds) when the acceleration is high, and at higher power turbine speeds when the acceleration is low. The only time maximum turbine speed can be reached, in a fixed gear, is when the acceleration of the turbine and the acceleration of the vehicle are zero. Downshifts are initiated at higher power turbine speeds when the deceleration is high, and at lower engine speeds when the deceleration is low. The only time minimum turbine speed can be reached is when the deceleration of the turbine wheel and vehicle are zero. If, with a fixed rate of ratio change and a given acceleration, a shift is initiated too late, a turbine overspeed will occur. On the other hand, if a shift is initiated too soon, this could result in insufficient power available to complete the shift which would result in a turbine underspeed and an immediate downshift at the completion of the shift. By initiating high acceleration upshifts earlier, a lower rate of ratio change can be used and still afford overspeed protection. The turbine wheel absorbs energy by increasing its speed during the upshift which results in lower shift shocks. During low acceleration upshifts, the turbine wheel decreases in speed, giving up energy to accelerate the vehicle. During high deceleration downshifts, the turbine wheel gives up energy to decrease vehicle deceleration. During low deceleration downshifts, the turbine speed increases, absorbing energy to further decelerate the vehicle.

The present invention solves the problem of programming acceleration versus power turbine speed for shift initiation and shifting fast enough to prevent turbine overspeed or underspeed with an acceptable shift shock level.

In accordance with the present invention, shifts are initiated by comparing the power turbine acceleration with power turbine speed. In this manner, the ultimate need for a shift, in order to prevent overspeed or underspeed, is anticipated and performed before critical conditions can arise. The control system function is performed without the necessity of having to directly measure acceleration or power turbine speed. This is accomplished in accordance with the invention by comparing the turbines constant speed output characteristics with the actual transmission input. By so doing, the turbine is used as an accelerometer and speed indicator.

Output torque of a power turbine may be used to determine when an upshift or downshift is required. However, while the output torque of a power turbine can be measured by any suitable torque reading device, the transmission in accordance with the invention is utilized as a simple means of eliminating the necessity of a torque meter or the like. Thus, as has been previously pointed out, in any fixed gear ratio, the reaction member hydraulic unit is at constant displacement. The reaction torque is, therefore, proportional to the hydraulic pressure developed by the hydraulic unit. The input torque to the transmission is proportional to this pressure because there is a direct mechanical reduction between the input and the hydraulic units. The input to hydraulic unit reduction is the same for both hydraulic units. The pressure from either unit and, therefore, through all gear ranges is always in the same proportion to the input torque. Accordingly, a conventional shuttle valve between the input discharge ports of both hydraulic units will always give the hydraulic pressure for the unit serving as the reaction member. The input torque to the transmission is, of course, equal to the output torque of the engine. Therefore, as will now be seen, the hydraulic unit pressure can and is used to measure power turbine torque.

The transmission input torque from the engine depends on two considerations; the acceleration or deceleration of the free power turbine and the power setting. The torque output of any free power turbine at constant speed increases with a power setting increase.

Figure 4:
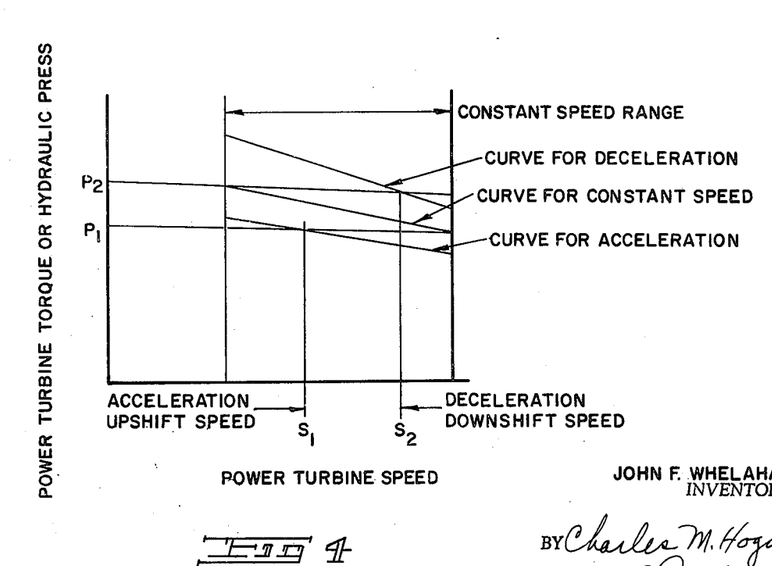
FIGURE 4 is a graphic representation of power turbine torque or hydraulic pressure versus power turbine speed for deceleration, constant speed and acceleration.

The constant speed value of torque at maximum power turbine speed (torque $T_1$) and the constant speed value of torque at minimum power turbine speed (torque $T_2$) decrease as the power setting decreases and increase as the power setting increases. Accordingly, if the equivalent hydraulic unit pressures are denoted as $P_1$ and $P_2$, it will be obvious that the hydraulic unit pressures also decrease as the power setting decreases and increase as the power setting increases. Therefore, for any particular power setting, there are particular values of $P_1$ and $P_2$ at which upshifts and downshifts will occur. In order to program these shift signals, the hydraulic unit pressure is biased by throttle setting. This is accomplished very simply in a hydrostatic unit pressure throttle position comparator by generating a force proportional to throttle setting by compressing in accordance with the invention a spring with a cam and using this force to bias a spool valve against hydraulic pressure. At any pressure between $P_1$ and $P_2$, associated with a particular throttle setting, the transmission will remain in its present gear range. If the pressure exceeds $P_2$, a downshift signal is produced and if the pressure falls below $P_1$, an upshift signal occurs. For a particular throttle position, setting $P_1$ as the upshift pressure signal and $P_2$ as the downshift pressure signal results in a considerable reduction of the power turbine speed range required under accelerating or decelerating conditions as shown in FIGURE 4. Because the turbine wheel is mechanically linked to the vehicle, the control system uses the torque characteristics of the turbine to sense the vehicles acceleration. The control system changes gear ratios within the extremities $S_1$ and $S_2$ (see FIGURE 4) of the speed range for depicted accelerating and decelerating conditions and thereby prevents overspeeding or underspeeding of the turbine. By varying the values of $P_1$ and $P_2$ with throttle lever setting, the control system simultaneously senses torque, power setting and vehicle acceleration. The automatic upshifting prevents turbine overspeed and minimizes shift shock by shifting at the correct turbine speed. A turbine speed is selected by considering the turbine wheel acceleration prior to the initiation of the shift and the overspeed, and shift shock is prevented by the decelerating effect of the ratio change upon the turbine wheel during the shift and the proper selection of the duration of the ratio change.

The decrease of optimum speed with decreasing power setting characterteristic of a free power turbine permits operation at low power turbine speeds at low power turbine settings without excessive off-optimum losses. It is therefore desirable to vary the free power turbine speed range with power setting and this is accomplished by appropriately contouring the cam in the aforementioned throttle position comparator to command free turbine speed ranges for each throttle position, which throttle cam is the cam that is used to bias the hydraulic unit pressures. With this additional contouring of the throttle cam, upshifts and downshifts will occur at lower turbine speeds at the lower throttle settings. The advantages of varying the speed range in this manner are reduced fuel consumption, wider overall utilization of the turbine range and increased overspeed protection at low throttle setings.

The throttle setting is preferred to bias the hydraulic pressure because its response time is faster than that of the engine. When the throttle lever is moved to a new position, the requirements of the total engine, transmission and vehicle system, as they correspond to the intentions of the vehicle operator, are anticipated and acted upon before crucial conditions can arise. For example, consider the situation where the turbine and vehicle are at zero acceleration at part throttle position and the turbine speed is at maximum. If the throttle is then suddenly depressed, the control system will immediately begin an upshift before the engine can respond to the new throttle position. The clutch engagement time and rates of ratio changing may be made fast enough, with the leeway afforded by the difference in time to throttle position placement and engine response, to prevent overspeed in all gear ratios. Fourth gear upshift, of course, is not possible in the embodiment herein disclosed. But the loop for positive turbine speed control may be closed by the use of a power turbine speed modulated vehicle speed retarder circuit. Such a vehicle speed retarder circuit may comprise a servo valve biased by an engine speed governor to actuate through a cylinder the hydraulic unit I swash plate. For example, as more fully described hereinafter, an upshift signal in combinaton with the fourth clutch being "on" will produce a signal to engage the third clutch and introduce the engine speed input into the control system. Thus, if the engine speed becomes greater than the permissible maximum of, for example, 28,500 r.p.m., the servo valve biased by the engine speed governor is arranged and adapted to cause the cylinder to move the hydraulic unit I swash plate overcenter toward the full displacement position from the initial zero displacement position until the engine speed reduces to the permissible maximum. When the speed falls below the permissible maximum, and the uphift signal is removed, the hydraulic unit I swash plate is then in its zero displacement position, and the third clutch disengaged. The retarder circuit is then "off." The engine speed input is then removed and the transmission remains in its fourth ratio range.

Start-up of the engine is in the neutral position in which all transmission clutches are disengaged. Aminimum idle interlock is provided which prevents start-up unless the throttle is at the minimum idle position. The interlock also prevents all clutches from disengaging in the neutral position until the throttle is in minimum idle position. After start-up, either forward or reverse may be selected, the shifting functions and ratio capabilities being the same for either forward or reverse. The inputs to the control system more fully described hereafter are:

(a) Throttle position provided by cam movement as previously described of a spring which changes the level and range of the upshift and downshift pressures in the throttle position comparator or shift signal valves.

(b) Hydrostatic pressure provided as previously described by a shuttle valve between the hydraulic unit discharge and inlet porting which sends the reaction member pressure to move one end of the shift signal valve. The other end of the shift signal valve is biased by throttle position as noted in (a) above.

(c) Swash plate position provided by a pressure signal produced by mechanically actuated valves which are actuated when the switch plate positioning cylinders are at either end of their stroke.

(d) Power turbine speed provided by two servo valves biased by a power turbine speed governor. The servo valves position the appropriate swash plate cylinder until the engine speed requirement is satisfied. This input is only required when the transmission is in low-low ratio and when the retarder circuit is "on."

The control system determines within itself the gear ratio of the transmission at any particular time by sensing the clutches which are engaged. The outputs of the control system are correct clutch engagements and disengagement sequencing and correct swash plate positioning and sequencing. The indirect outputs of the control system are proper ratio for prevailing conditions and positive power turbine speed control.

The shifting control functions will now be briefly discussed with respect to a low-low, first, second, third and fourth ratios or ranges and then a discussion of the control system for effecting shifting will be discussed. The various ratios and control functions which produce them are as follows:

LOW-LOW RANGE

Forward and reverse are manually selected. After manual selection of forward or reverse, the first range clutch 84 is engaged. The selected forward clutch 54 or reverse clutch 56 is then subsequently engaged. The throttle position input which produces the upshift and downshift pressures is compared in the hydrostatic pressure throttle position comparator or shift signal valve to the hydrostatic unit pressure with the swash plate in the first range position at startup. If this hydrostatic pressure is greater than the downshift pressure, a new input (engine speed) is introduced into the system. If the power turbine speed becomes less than the permissible minimum, such as for example 12,000 r.p.m., the low-low brake will be engaged. After the low-low brake is engaged, the swash plate of hydraulic unit II, which is in the zero displacement position, will move toward full displacement. This lowers the gear ratio, thereby producing greater output torque. When the power turbine speed becomes greater than the aforementioned minimum, the swash plate will begin to move back toward the zero displacement position and when the condition arises that the power turbine speed is greater than the aforementioned minimum, and the swash plate is positioned at zero displacement, the low-low brake is disengaged and the engine speed input is removed. At this time, the transmission is once again in the first ratio range.

FIRST RATIO RANGE

The transmission is in the first ratio range after forward or reverse has been selected. To get to the first ratio range from the second ratio range on a downshift, the hydrostatic pressure throttle position comparator or shift signal valve must indicate a downshift signal. This occurs when the aforementioned hydrostatic pressure is greater than the downshift pressure indicated by throttle position. After indication of the downshift signal, the control system checks which clutch is "on" and then produces a further signal to engage the clutch in the next lowest range. The further signal is produced by a valve armed with clutch pressure and triggered by the downshift pressure signal. In this case, the second range clutch 128 is engaged and it produces a signal to engage the first range clutch 84. After the first range clutch is engaged, the swash plates are both moved to their opposite positions and after the swash plates have arrived at their new positions, the second range clutch is disengaged. A signal to disengage the fourth range clutch 142 is produced simultaneously but since the fourth range clutch is already disengaged, the transmission ratio will not be affected. If the transmission is in the fourth range and a similar downshift signal is produced, the downshift to the third range is completed in a manner similar to the downshift from third to second range, and the fourth range clutch is disengaged at the completion of the swash plate travel.

SECOND RATIO RANGE

An upshift from the first to the second ratio range is initiated by the hydrostatic unit pressure throttle position comparator or shift signal valve producing an upshift signal when the hydrostatic unit pressure falls below the upshift pressure scheduled by the throttle cam of the aforementioned comparator. When the upshift signal is produced, the control system checks the clutches to determine which clutch is engaged. In this case, the first range clutch 84 is engaged and this in addition to the upshift signal engages the second range clutch 128. After the second range clutch is engaged, the swash plates move to their opposite positions. When the swash plates have completed their travel, the first range clutch will be disengaged and this completes the upshift from first to second range.

The third range clutch 135 is simultaneously disengaged with the first range clutch but when the shift is made from the first to the second range, the third range clutch is disengaged so that transmission ratio is not thereby affected. If the transmission is in the third range and the upshift is to the fourth range, the shift will be completed in a similar manner and the third range clutch will disengage at the completion of the shift.

A downshift to the second and third range occurs if the hydrostatic unit pressure is greater than the downshift pressure scheduled by the throttle position. The downshift signal in combination with the third range clutch being "on" produces a signal to engage the second range clutch. After the second range clutch is engaged, the swash plates move to their opposite positions and when this movement is complete, the third range clutch is disengaged, thereby completing the downshift. The first range clutch 84 is disengaged simultaneously. This will produce a similar downshift completion if the downshift is from the second to the first range.

THIRD RATIO RANGE

An upshift signal in combination with the second range clutch being "on" produces a signal to engage the third range clutch 135. When the third range clutch is engaged, the swash plates move to their opposite position and after their movement is completed, the second range clutch 128 is disengaged. A signal to disengage the fourth range clutch 142 is produced simultaneously but since the fourth range clutch is already disengaged, the transmission ratio will not be affected.

A downshift from the fourth to the third range is discussed in connection with the discussion of the first ratio range.

FOURTH RATIO RANGE

An upshift from the third to the fourth range is discussed in the section on the second ratio range. An upshift signal in combination with the fourth range clutch 142 being "on" produces a signal to engage the third range clutch 135 and introduces the engine speed input into the control system. Accordingly, if the engine speed becomes greater than the permissible maximum, such as for example 25,500 r.p.m., a servo valve biased by an engine speed governor causes a cylinder to move the swash plate of the hydraulic unit I overcenter toward the full displacement position from the initial zero displacement position until the engine speed drops back to the aforementioned permissible maximum r.p.m. When the speed falls below the maximum r.p.m. and the upshift signal is removed, the aforementioned swash plate is in its zero displacement position and the third range clutch is disengaged. The aforementioned circuit which may be referred to as a retarder circuit is then "off," the engine speed input is removed and the transmission remains in the fourth ratio range. Because the fourth range is the top gear for purposes of this discussion, upshifts are not of course possible in this position. The hydraulic control system which will now be discussed may be built in a manifold block of the order of 12 x 6 x 6 inches.

Figure 5:
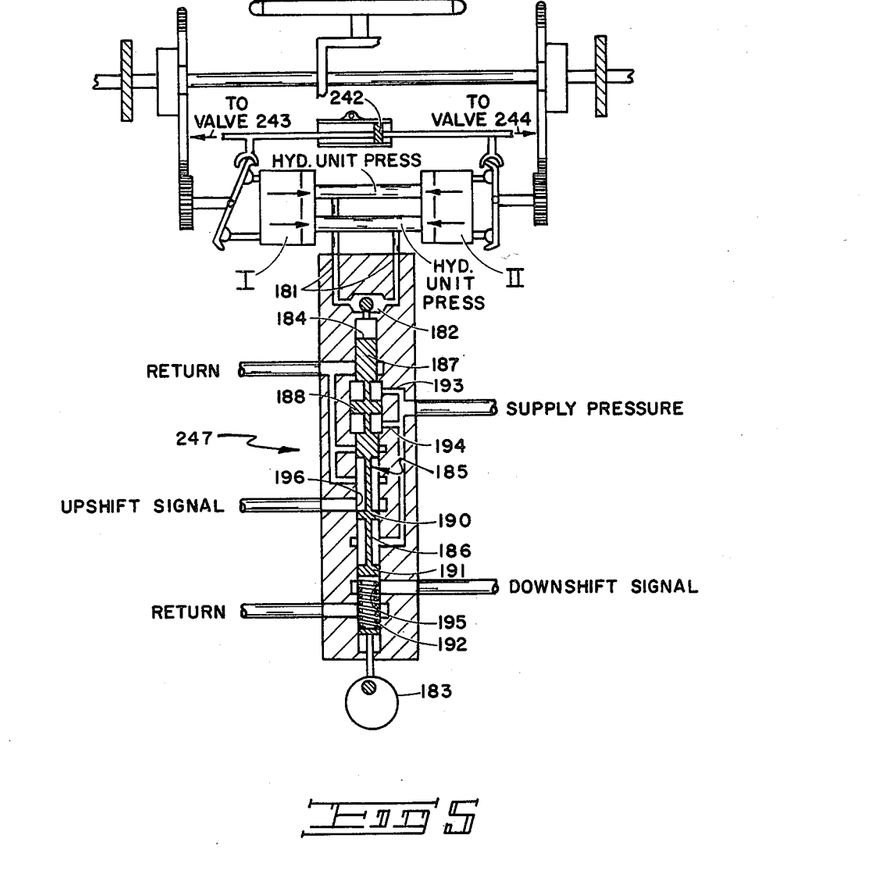
FIGURE 5 is a fragmentary and partially cross sectional view of the shift signal valve and the hydraulic units.

The shift signal valve, generally designated by the numeral 247, shown in detail in FIGURE 5 to which attention is now directed, is hydraulically coupled to the hydraulic units I and II via suitable conduits 181 and a shuttle valve 182 and mechanically coupled to the throttle via a cam 183. The shift signal valve 247 is shown in FIGURE 5 in the no-shift position. In the no-shift position, the hydraulic unit pressure (which is obtainable from either hydraulic unit I or hydraulic unit II) is coupled to the shift signal valve 247 through the shuttle valve 182 and acts on the uppermost surface 184 of the spool generally designated by the numeral 185. Spool 185 is comprised of a shaft 186 and pistons 187–191. The hydraulic unit pressure on the uppermost surface 184 of piston 187 is countered by the force of a spring 192 in engagement with the bottom lowermost surface of piston 191 and biased by cam 183. The forces of the supply pressure coupled to piston 188 through orifices 192 and 193 are cancelled because they act upon equal face areas.

If the hydraulic unit pressure via shuttle valve 182 increases while the throttle position cam 183 remains in a fixed position, the increasing pressure on piston 187 resulting from the increase in hydraulic unit pressure will move the spool 185 down or away from shuttle valve 182 until the spring 192 is compressed an amount sufficient to just balance the force of the hydraulic unit pressure. When piston 189 moves down to a point where the supply pressure from orifice 194 is coupled or dumped to return, there then exists an unbalance of forces across piston 188 which causes the spool 185 to suddenly snap to its full down position. In its full down position, spool 185 couples the supply pressure to the downshift port 195 and thereby provides a downshift signal to the control system more fully described hereinafter. The spool 185 remains in its full down position until either the hydraulic unit pressure is reduced or the throttle position cam 183 is repositioned to increase the force on the spring an amount sufficient to move the spool 185 back to the no-shift position as shown in FIGURE 5.

A decrease in hydraulic unit pressure with the throttle position cam 183 maintained in a fixed position will cause the spool 185 to rise or move towards shuttle valve 182. When the spool 185 has risen a sufficient distance, piston 187 couples the supply pressure at orifice 193 to return thereby again creating an unbalance of forces across piston 188. Accordingly, the spool 185 now snaps to its full up position due to the aforementioned differential created across piston 188. When spool 185 is in its full up position, the upshift signal port 196 is coupled to the supply pressure and an upshift signal is thereby provided to the control system. Corresponding increases or decreases in the position of cam 183 with constant hydraulic unit pressure will result in movements of spool 185 as described above to produce upshift or downshift signals.

Hydraulic unit pressure and the position of the throttle position cam 183 are variable simultaneously to produce upshift, downshift or no-shift signals. If the hydraulic unit pressure is greater or less than the instantaneous throttle position by a suitable fixed amount, a downshift or an upshift signal will be produced. All hydraulic pressure and throttle position differences between that required to produce an upshift or downshift signal will not produce a shift signal.

Figure 6:
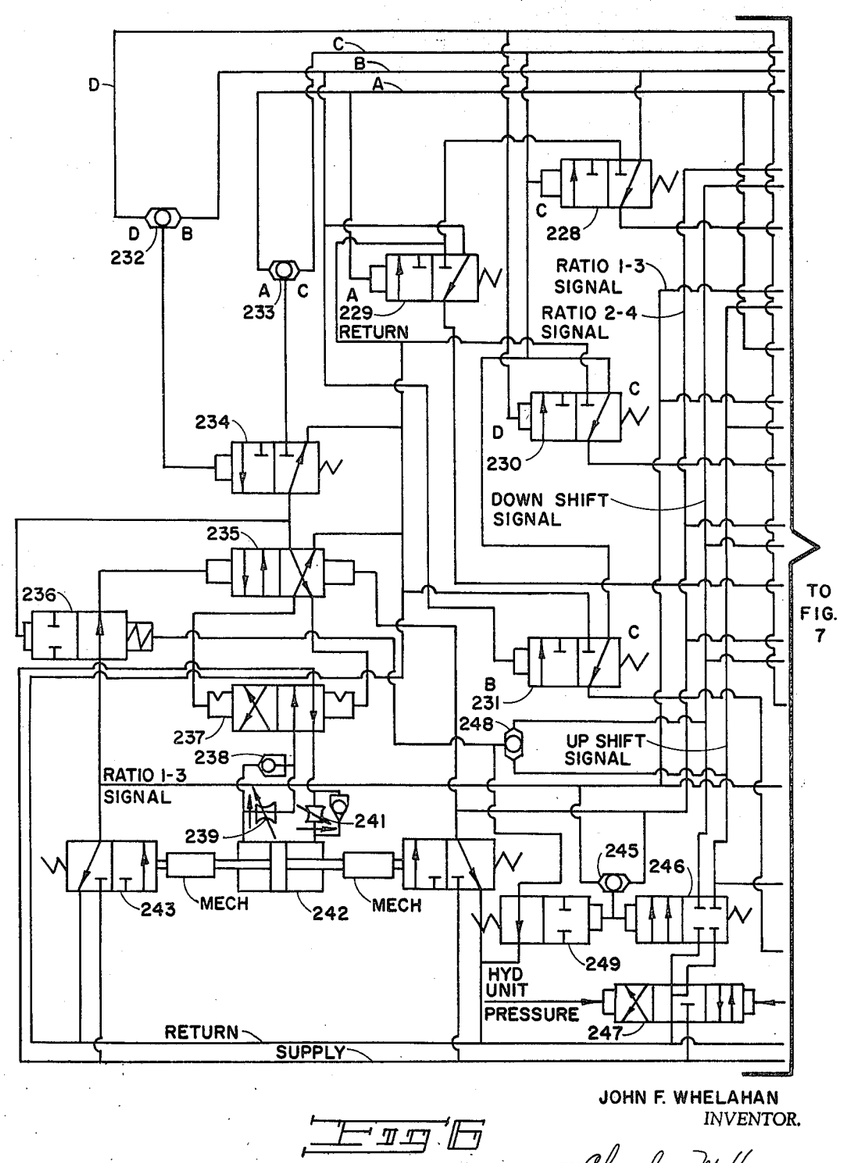
FIGURES 6 and 7 are a schematic of the control system.
Figure 7:
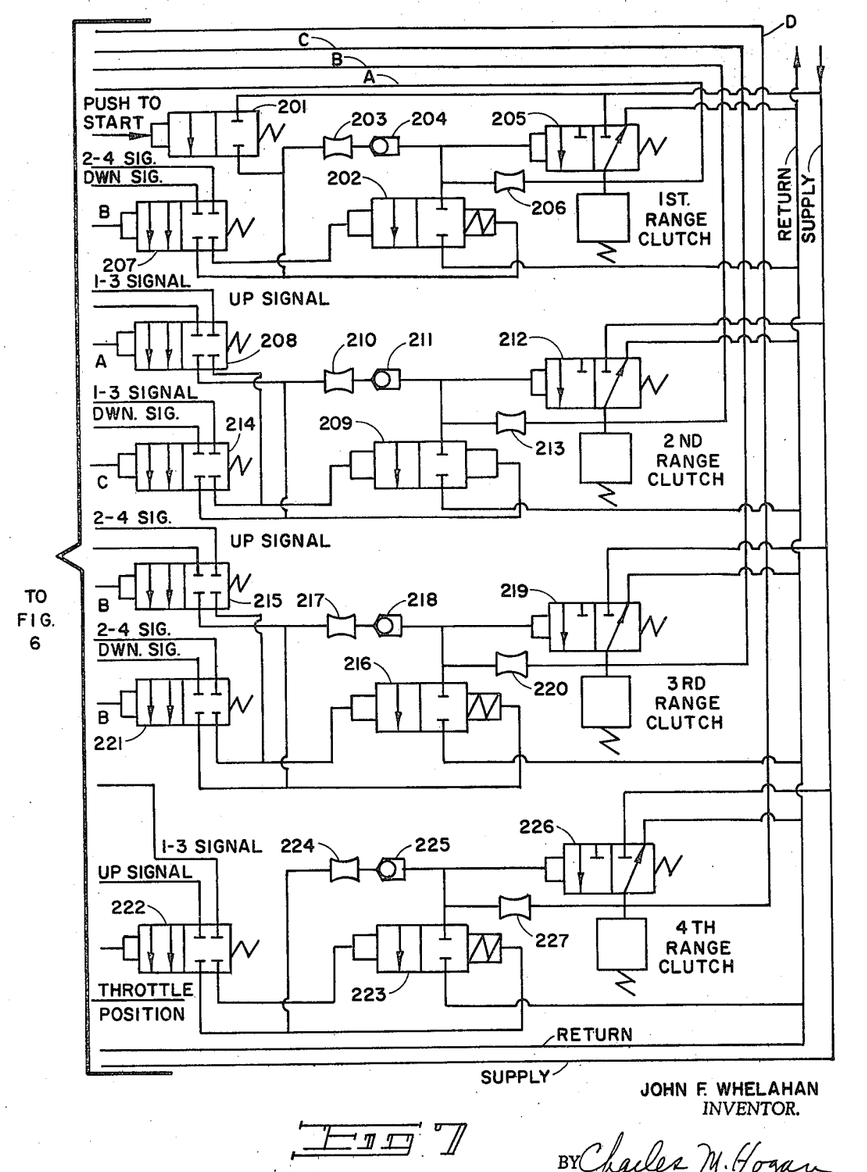

Having now described the shift signal valve, its function and operation, attention is now directed to FIGURES 6 and 7 which when combined show in schematic form the control system including the shift signal valve.

The valves comprising the control system are shown in schematic form in accordance with conventional procedures. Accordingly, the various valves are schematically shown in their normal position, the right hand portion of each valve illustrating (with the exception of valves 243 and 249 which are shown reversed) normally off conditions and the left hand portion illustrating conditions when the valve is on or actuated. The arrows in the valves designate the presence of and direction of flow and the absence of an arrow designates that flow is cut off. Further, the various valves as may be appropriate are provided at their end portions with conventional pilot actuator means and/or spring biasing means. Thus, in FIGURE 7, valve 205 in the uppermost right hand corner is provided with conventional pilot actuator means at its left end and conventional spring biasing means at its right end.

In the following discussion, the "ratio 1–3 signal" (identified as "1–3 SIG." in FIGURE 7) is that signal provided by hydraulic unit I (see FIGURE 1 and FIGURE 5) when it is at full displacement and the power path in the transmission is accordingly through the gear range 1 or gear range 3. Similarly, the "ratio 2–4 signal" (identified as "2–4 SIG." in FIGURE 7) is that signal provided by the hydraulic unit II when it is at full displacement and accordingly, the power path is through gear range 2 or gear range 4.

At startup, each of the 1–4 range clutches (see FIGURE 7) are disengaged and double-ended piston 242 which also actuates the swash plates of hydraulic plates I and II (see FIGURE 5) is pressurized through shift time control valve 241 (a flow control, pressure compensated and adjustable valve) so that the left hand rod end of piston 242 mechanically actuates via mechanical means ratio 1–3 signal valve 243 (a mechanically actuated, normally connected to return, three-way, two-position, directional control valve) to allow the ratio 1–3 signal to be supplied to the system. Ratio 1–3 signal via shuttle valve 245 actuates the shift indicator valve 246 (a pilot operated, normally off, four-way, two-position shut off valve) which permits passage of upshift (UP. SIG.) and downshift (DWN. SIG.) signals to the control system.

Manually actuating start valve 201 (a manually actuated, normally off, two-way, two-position shut off valve) couples the supply pressure through restrictor valve 203 and check valve 204 to actuate the first range clutch engagement valve 205 (a pilot operated, normally connected to return, three-way, two-position directional control valve), which connects the supply pressure to actuate the first range clutch to its engaged position. When manual actuation of valve 201 is removed, the first range clutch engagement valve 205 remains actuated until the first range dump valve 202 (a pilot operated, normally off, two-way, two-position shut off valve) is actuated. Check valve 204 prevents the pilot actuator of valve 205 from dumping back into the main system and in the event of leakage valve 205 is maintained in its actuated position by makeup which is provided through restrictor valve 206. Restrictor valves 213, 220 and 227 perform for their respective gear ranges, the same function as restrictor valve 206. Pressure from valve 205 when actuated goes to shuttle valve 233 to arm reverse signal valve 234 (a pilot operated, normally connected to return, three-way, two-position directional control valve). Pressure from valve 205 simultaneously is supplied to and actuates valve 208 (a pilot operated, normally off, four-way, two-position shut off valve) which directs the ratio 1–3 signal to valve 209 (a pilot operated, normally off, two-way, two-position shut off valve) to attempt to actuate it. The aforementioned ratio 1–3 signal is supplied to the left hand pilot actuator of valve 209. However, the other pilot actuator valve 209, which is spring loaded to the off position, is blocked by valve 214 (a pilot operated, normally off, four-way, two-position shut off valve). Because of this hydraulic lock, valve 209 cannot be actuated until valve 214 is actuated. Thus, with only the first range clutch engaged and piston 242 in its initial position, the transmission is engaged in its first gear range. If a downshift signal occurs, it will not have any effect because valves 207, 214 and 221 are not actuated. If an upshift signals occurs, it will pass through valve 208 which, as previously described, is actuated at this time and then through restrictor valve 210 and check valve 211 to actuate valve 212 (a pilot operated, normally connected to return, three-way, two-position directional control valve) which directs supply pressure through to engage the second range clutch. Supply pressure from valve 212 is blocked by valve 229 (a pilot operated, normally connected to "B" (see top of FIGURE 6), three-way, two-position directional control valve) which is actuated by supply pressure from valve 205, thus preventing actuation of valve 215 (a pilot operated, normally off, four-way, two-position shut off valve). Supply pressure from valve 212 actuates valve 234 via shuttle valve 232. Valve 234, as previously described, is armed by supply pressure from valve 205. When actuated, valve 234 provides a signal through valve 23 (a pilot operated, free spool, four-way, two-position directional control valve) which is actuated (to the right) by the ratio 1-3 signal which passes through valve 236 (a pilot operated, normally on, two-way, two-position shut off valve). The signal from valve 234 tries to actuate valve 236, via the left hand pilot actuator, but the combination of the spring biasing means and the upshift signal which is provided through shuttle valve 248 to the opposite end of valve 236 prevents valve 236 from being actuated or moving. The signal from valve 235 actuates valve 237 (a pilot operated, two-position, mechanically detented, four-way directional control valve) to the right. Valve 237 is detented in this position. Supply pressure through valve 237 is now reversed from valve 241 to valve 239 (which are both flow control, pressure compensated and adjustable valves) causing the swash plate actuator piston 242 to move to the right. The time rate of travel of piston 242 is determined by the setting of the adjustable flow control valves 239 and 241. Check valves 238 and 240 are free flow return valves. When piston 242 begins to move, it releases the mechanical actuation from valve 243 which then dumps or couples the ratio 1-3 signal to return. While piston 242 is traveling, both the ratio 1-3 and ratio 2-4 signals are dumped to return and, hence, there is no signal through shuttle valve 245 to keep valve 246 actuated.

With valve 236 in its off position, upshift and downshift signals cannot go through. The signal from valve 249 (a pilot operated, normally on, two-way, two-position shut off valve) is also removed and in its on position the signal supplied to the spring biased end of valve 236 is dumped to return. The signal from valve 234 now actuates valve 236 which produces a hydraulic lock to prevent valve 235 from moving.

When the upshift and downshift signals are shut off from the system, other shifts cannot be initiated and, accordingly, the shift in progress goes to completion. When piston 242 reaches the end of its travel, it mechanically actuates valve 244 (a mechanically operated, normally connected to return, three-way, two-position directional control valve). When valve 244 is thus actuated, the ratio 2-4 signal is active and passes through valve 207 (a pilot operated, normally off, four-way, two-position shut off valve) which is actuated to its on position because the second range clutch is in its actuated position. The ratio 2-4 signal through valve 207 actuates valve 202 if a downshift signal does not exist. When the ratio 2-4 signal is coupled to the system at the end of the travel of piston 242, the ratio 2-4 signal passes through shuttle valve 245 to actuate valve 246 which then permits free pasage of upshift or downshift signals to the system. When valve 202 is actuated, the pilot actuator of valve 205 is dumped to return through valve 202 and valve 205 is then actuated to connect the first range clutch to return and thereby cause the first range clutch to be disengaged. When the first range clutch is disengaged, valve 229 returns to its normal position which allows passage of supply pressure from valve 212 to actuate valve 215. Ratio 2-4 signal passes through valve 215 when it is actuated and this signal attempts to actuate valve 216 (a pilot operated, normally off, two-way, two-position shut off valve) but it cannot do so because valve 221 (a pilot operated, normally off, four-way, two-position shut off valve) is in its off position, thereby causing a hydraulic lock on valve 216.

If a downshift signal exists at the end of the travel of piston 242, this signal will go through valve 207 to the spring biased end of valve 202. The combination of the aforementioned downshift signal and the spring force prevents valve 202 from being actuated by the ratio 2-4 signal coupled through valve 207 and, hence, the first range clutch remains actuated. The signal coupled to valve 235 via shuttle valve 233 and valve 234 still exists. The advent of the ratio 2-4 signal actuates valve 246 through shuttle valve 245, thereby permitting the downshift signal to pass through valve 246 to shuttle valve 248 and thence to the spring biased pilot actuator of valve 236 and actuate valve 236 to the on position. The previously mentioned hydraulic lock on valve 235 is now released and the ratio 2-4 signal shifts valve 235 to the left which causes the direction of the signal from valve 235 to valve 237 to be reversed. This reversed signal shifts valve 237 to the left causing the supply pressure to switch from valve 239 to valve 241 which starts the piston 242 traveling towards its opposite extreme position. When piston 242 begins to move, the mechanical actuation of valve 244 is released and the ratio 2-4 signal is dumped to return. This removes the actuation signal from valve 246 causing it to move to the right which blocks off all downshift or upshift signals until the shift is completed. This also dumps the signal from the shuttle valve 248 to return through valve 249. This in turn relieves the spring end of valve 236 which then locks valve 235. At the end of travel of piston 242, valve 243 is mechanically actuated to produce the ratio 1-3 signal. The ratio 1-3 signal actuates valves 246 and 249, thereby opening the system to upshift or downshift signals from the shift signal valve 247. If neither an upshift nor a downshift signal appears, the ratio 1-3 signal goes through valve 208 and actuates valve 209. The spring biased pilot actuator of valve 209 is connected to return through valves 208, 246, and 247. Actuated valve 209 dumps the pilot actuator of valve 212 to return. Valve 212 then shifts to the left coupling the second range clutch to return and thereby disengaging it. With only the first range clutch engaged, the transmission is again in its first gear range.

If an upshift signal should still exist at the end of an upshift from the first gear range to the second gear range, the upshift signal cannot go through valve 215 and initiate actuation of the third range clutch until the first range clutch is disengaged. Valve 229 is returned to its normal position after its pilot actuator is vented to return through valve 205 and thereafter supply pressure from valve 212 is coupled to and actuates valve 215. The upshift signal coupled through valve 215 to the spring biased pilot actuator of valve 216 prevents valve 216 from being actuated by the ratio 2-4 signal coupled to the opposite pilot actuator of valve 216 through valve 215. The upshift signal passes through restrictor valve 217 and check valve 218 to actuate valve 219 (a pilot operated, normally connected to return, three-way, two-position directional control valve). Actuation of valve 219 results in engagement of the third range clutch. With the second range clutch engaged, valve 231 (a pilot operated, normally connected to "C," three-way two-position directional control valve) is actuated to its off position so that the pilot actuator of valve 222 (a pilot operated, normally off, four-way, two-position shut off valve) is connected to return, thus preventing actuation of the fourth range clutch by the upshift signal which is coupled to valve 222. With the second and third range clutches engaged, valve 234 couples a signal to valve 235. Valve 235 couples this signal to the right hand pilot actuator of valve 237, thus shifting this valve and thereby reversing the supply pressure coupled to piston 242. When piston 242 begins to move, the ratio 2–4 signal is dumped through valve 244, the upshift signal is blocked by valve 246, and the spring biased pilot actuator of valve 236 is dumped through valve 249. Valve 236 now shifts and locks valve 235 in position. At the end of travel of piston 242, valve 243 is actuated producing the ratio 1–3 signal. The ratio 1–3 signal actuates valves 249 and 246 via shuttle valve 245, thereby coupling upshift or downshift signals to the system. If neither an upshift nor downshift signal is present at the end of travel of piston 242, the ratio 1–3 signal goes through valve 214 to actuate valve 209 which dumps the pilot signal from valve 212, thereby causing the second range clutch to become disengaged. When the second range clutch is disengaged, the supply pressure actuates valve 222 through valve 231. The ratio 1–3 signal actuates valve 223 (a pilot operated, normally off, two-way, two-position shut off valve) through valve 222. Actuation of valve 223 disengages the fourth range clutch but since this clutch is in its disengaged position, this action is of no consequence.

If an upshift signal exists at the end of travel of piston 242, the second range clutch would be disengaged in the manner just described and in addition thereto, the upshift signal would go through valve 222 to prevent valve 223 from being actuated by the ratio 1–3 signal and thereafter continue through restrictor valve 224 and check valve 225 to actuate valve 226 (a pilot operated, normally connected to return, three-way, two position directional control valve) which would engage the fourth range clutch. When the fourth range clutch is engaged, the signal from valve 226 will replace the signal from valve 212 at shuttle valve 232 and therefore valve 234 will continue to arm valve 235. Valve 235 is positioned by the ratio 1–3 signal to actuate valve 237 so that the supply pressure to piston 242 is reversed. When piston 242 begins to move the ratio 1–3 signal is dumped to return through valve 243 and the pilot actuators of valves 246 and 249 are dumped to return which locks out upshift and downshift signals and locks valve 235 by allowing valve 236 to be actuated until the completion of travel of piston 242 at which time the ratio 2–4 signal is produced through mechanical actuation of valve 244. In the absence of a downshift signal, the ratio 2–4 signal passes through valve 221 which is actuated by supply pressure from valve 226 to actuate valve 216. Valve 216 vents the pilot actuator of valve 219 to return which causes the third range clutch to become disengaged. This results in the transmission now being in the fourth gear range.

When the transmission is in the fourth gear range, a downshift signal and the ratio 2–4 signal passes through valve 221 to actuate valve 216 to its off position and actuate valve 219 through restrictor valve 217 and check valve 218 to cause the third range clutch to become engaged. When the third range clutch is engaged, valve 234 provides a signal to valve 235 which has been repositioned by the ratio 2–4 signal. Valve 235 then shifts valve 237 to cause piston 242 to move towards its opposite end. When piston 242 completes it travel, valve 243 is actuated. Actuation of valve 243 produces the ratio 1–3 signal which in the absence of an upshift signal passes through valve 222 to actuate valve 223 the actuation of which dumps the pilot actuator of valve 226 which in turn causes the fourth range clutch to be disengaged and place the transmission in the third gear range.

A further downshift signal will pass through valve 214 to actuate valve 212 which causes engagement of the second range clutch. The ratio 1–3 signal causes valve 235 to change its position so that upon engagement of the second range clutch valve 237 will reverse the supply pressure to move piston 242 towards its opposite extreme.

At the completion of travel of piston 242, valve 244 is actuated to produce the ratio 2–4 signal which passes through valve 215 to actuate valve 216. Actuation of valve 216 dumps the pilot actuator of valve 219 to cause the third range clutch to become disengaged. The transmission is now in the second range.

Check valves 238 and 240 permit free flow return from the vented side of the cylinder actuator 242. Without these valves, the return flow would be forced to exit through the flow control valves 239 or 241. In order to properly time the actuation of cylinder 242, with return through the flow control valves, the flow control valves would both have to be adjusted in series and would have to be designed to be pressure compensated and control flow in both directions. In order to avoid this design and control problem, check valves 238 and 240 are included to permit free return flow.

Various other modifications and adaptations will be readily apparent to persons skilled in the art, and it is intended, therefore, that this invention be limited only by the appended claims as interpreted in the light of the prior art.

What is claimed is:

1. In a transmission comprising first and second ratio controlled gear sets for transmitting power from a variable speed turbine source to a loaded output shaft, said first set having first input, output, and reaction members, said second set having second input, output, and reaction members; hydraulic variable reaction means for applying a variable hydraulic reaction force to each of said first and second reaction members; and throttle means for controlling the speed of said turbine, the combination comprising:
   (a) shift signal means for providing upshift and downshift signals when said reaction force is not within a predetermined pressure range; and
   (b) means actuated by said shift signal means for providing predetermined engagement and disengagement sequencing of said gear sets with said output shaft and actuation of said reaction means when said reaction force is not within said predetermined range to transfer engagement of one of said gear sets to the other of said gear sets.

2. In a transmission comprising first and second ratio controlled gear sets for transmitting power from a variable speed turbine source to a loaded output shaft, said first set having first input, output, and reaction members, said second set having second input, output, and reaction members; hydraulic variable reaction means for applying a variable hydraulic reaction force to each of said first and second reaction members; and throttle means for controlling the speed of said turbine, the combination comprising:
   (a) shift signal means for providing upshift and downshift signals when said reaction force is not within a predetermined pressure range, said shift signal means being coupled to said reaction force and said throttle means whereby the level and range of said pressure range is controlled by throttle position and said reaction force; and
   (b) means actuated by said shift signal means for providing predetermined engagement and disengagement sequencing of said gear sets with said output shaft and actuation of said reaction means when said reaction force is not within said predetermined range to transfer engagement of one of said gear sets to the other of said gear sets.

3. The combination as defined in claim 2 wherein said shift signal means includes further means for comparing said reaction force and a force proportional to throttle setting, the upper limit of said predetermined pressure range being proportional to the constant speed value of torque at maximum turbine speed and the lower limit of said predetermined pressure range being proportional to the constant speed value of torque at minimum turbine speed, and said upper and lower pressure limits vary proportionately with throttle position.

4. The combination as defined in claim 3 wherein said further means comprises valve means hydraulically coupled to said reaction means and mechanically coupled via spring and cam means to said throttle means whereby a downshift signal is produced when said reaction force is greater than the force proportional to the throttle setting by a predetermined amount.

5. In a transmission comprising first and second ratio controlled gear sets for transmitting power from a variable speed turbine source to a loaded output shaft, said first set having first input, output, and reaction members, said second set having second input, output and reaction members; hydraulic variable reaction means for applying a variable hydraulic reaction force to each of said first and second reaction members; and throttle means for controlling the speed of said turbine, the combination comprising:

(a) shift signal means for providing upshift and downshift signals for transferring engagement to said output shaft of one of said gear sets to the other of said gear sets, said shift signal means including further means actuated by said reaction force and said throttle means, said reaction force being biased by a force proportional to the position of said throttle means to provide a downshift signal if the speed of said turbine exceeds a predetermined maximum value and an upshift signal if the speed of said turbine is less than a predetermined minimum amount; and (b) means actuated by said shift signal means for providing predetermined engagement and disengagement sequencing of said gear sets with said output shaft and actuation of said reaction means.

6. The combination as defined in claim 5 wherein said means actuated by said shift signal means oppositely applies said reaction force to said reaction member upon provision of a shift signal, said first gear set additionally including first speed range gears, said second gear set including second speed range gears; first and second selectively engageable clutches for coupling said turbine source to said output shaft through said input and output members of said first and second gear sets and said first and second speed range gears, respectively; and said means actuated by said shift signal means additionally oppositely engages and disengages said clutches upon provision of a shift signal.

7. In a transmission for transmitting power from variable speed turbine driving means to each of two tracks, said transmission including first and second planetary gear sets, said first set having first input, output and reaction members, said second set having second input, output and reaction members; a hydraulic transmission for selectively applying a variable reaction force to each of said reaction members, said hydraulic transmission being adjustable to oppositely vary the reaction force on said first and second reaction members, respectively; first and second speed range gears; first and second selectively engageable clutches for coupling said source to said tracks through said input and output members of said first and second planetary gear sets and said first and second speed range gears, respectively; and adjustable throttle means for controlling the speed of said turbine, the combination for changing gears comprising:

(a) shift signal means for providing upshift and downshift signals, said shift signal means being in communication with said reactive force;

(b) means coupled to said shift signal means for providing in opposition to said reaction force a first force proportional to throttle setting for actuating said shift signal means to provide a downshift signal when said reaction force is greater by a predetermined amount than said first force and an upshift signal when said reaction force is less by a predetermined amount than said first force;

(c) and control means actuated by said shift signal means for providing predetermined engagement and disengagement of said first and second clutches and actuating said hydraulic transmission to oppositely vary the reaction force on said first and second reaction members to change gears in accordance with said shift signals.

8. The combination as defined in claim 7 wherein said control means includes further means for engaging one of said clutches upon receipt of a shift signal whereby both clutches are then engaged, thereafter readjusting said hydraulic transmission to decrease to zero the reaction force on the reaction member coupled to said reaction force and increasing to a maximum the reaction force on said other reaction member, and thereafter disengaging the clutch engaged prior to receipt of said shift signal.

References Cited
UNITED STATES PATENTS

| | | | |
|---|---|---|---|
| 2,585,790 | 2/1952 | Kelley | 180—6.7 |
| 2,997,892 | 8/1961 | Brunot | 74—843 |
| 3,139,766 | 7/1964 | Granryd | 74—843 |
| 3,327,798 | 6/1967 | Siber et al. | 180—6.7 |
| 3,368,425 | 2/1968 | Lewis | 74—720.5 |
| 3,442,153 | 5/1969 | Ross | 74—687 |

ARTHUR T. McKEON, Primary Examiner

U.S. Cl. X.R.

74—687, 720.5; 180—6.7

PO-1050
(5/69)

UNITED STATES PATENT OFFICE
CERTIFICATE OF CORRECTION

Patent No. 3,496,803      Dated February 24, 1970

Inventor(s) John F. Whelahan

It is certified that error appears in the above-identified patent and that said Letters Patent are hereby corrected as shown below:

Column 1, line 5, for "Arco" read---Avco---; Column 2, line 67, for "is" read---it---; Column 5, line 7, after "angle" read---its shaft is free to rotate. However, if the swash plate of the associated unit is at a maximum angle, its shaft will---; Column 5, line 8, after "locked" delete---By simultaneously titling the swash plates of the associated unit is at a maximum angle, its shaft will be locekd---; Column 5, line 65, for "parts" read---pairs---; Column 8, line 9, for "setings" read---settings---; Column 8, line 52, for "Aminimum" read---A minimum---; Column 10, line 63, for "25,500" read---28,500---; Column 12, line 70, after "valve" read---of---; Column 13, lines 4 and 5, for "signals" read-signal---; and Column 13, line 21, for "23" read---235---.

Signed and sealed this 23rd day of March 1971.

(SEAL)
Attest:

EDWARD M. FLETCHER, JR.    WILLIAM E. SCHUYLER, JR.
Attesting Officer       Commissioner of Patents